United States Patent

[11] 3,590,509

| [72] | Inventor | Minoru Fukumitsu<br>c/o James M. Morita, City Bank Bldg.,<br>Honolulu, Hawaii |
|---|---|---|
| [21] | Appl. No. | 844,924 |
| [22] | Filed | July 25, 1969 |
| [45] | Patented | July 6, 1971 |
| [32] | Priority | July 25, 1968 |
| [33] | | Japan |
| [31] | | 43/63962 |

[54] LIGHT-REFLECTIVE DISPLAY DEVICE
7 Claims, 6 Drawing Figs.

| [52] | U.S. Cl. | 40/136 |
|---|---|---|
| [51] | Int. Cl. | G09f 7/00 |
| [50] | Field of Search | 40/125 D, 125 L, 208, 136 |

[56] References Cited
UNITED STATES PATENTS

| 1,990,224 | 2/1935 | Cochran | 40/136 |
|---|---|---|---|
| 2,587,325 | 2/1952 | Husted | 40/208 |
| 3,096,596 | 7/1963 | Magnuson et al. | 40/136 X |

*Primary Examiner*—Lawrence Charles
*Attorney*—Waters, Roditi, Schwartz & Nissen ABSTRACT: Concave lens elements are formed in a sheet of plastic in the form of letters or the like and are filled in with transparent plastic. A backing of embossed and metallized plastic sheet is provided for light-reflecting purposes. An intermediate colored and transparent sheet can also be employed to color the reflected light.

LIGHT-REFLECTIVE DISPLAY DEVICE

DETAILED DESCRIPTION

This invention relates to visual display devices and more particularly to novel static display devices having unusual and distinctive aesthetic characteristics as well as being especially noticeable in order to attract the visual attention of an observer.

In the display industry, it has been a long-standing problem to devise an appealing visual device such as a sign or display board that is not only distinctive from an aesthetic point of view but that is capable of attracting or diverting the visual attention of observers and persons passing the display for a variety of reasons and purposes. Such a device or sign may be employed for advertising purposes or identifying a business establishment such as a restaurant or office building for example.

Although some conventional static display devices have been used for these purposes, certain problems and difficulties have been encountered which are due primarily to the fact that expensive lens systems are often employed in connection with elaborate lighting means to increase the visual appeal of the display device. Obviously, such optical and lighting systems, whether used individually or in combination, are relatively costly to fabricate, install and maintain.

In some instances, it is highly desirable to enhance the overall effect of the display device by creating the illusion of movement. Conventional display apparatus offering such movement is derived by using a rotatable disc or wheel which is driven past a light source. In other instances, the effect of movement is achieved by utilizing a variety of masks or interference discs or plates which when moved relative to each other cause the displacing or alteration of transmitted light so that an optical illusion portraying movement is evolved. Conventional display apparatus, as noted above, generally requires a high level of standby power, driving mechanisms and precise layout of the optical system during fabrication.

The problems and difficulties encountered by conventional display apparatus are obviated by the device of the present invention. A mold, preformed to correspond to a desired configuration or shape such as a letter of the alphabet or numeral and having a chamber-defining wall, incorporates a simple convex lens on its forward face and terminates in substantially parallel-spaced rear edges that define an opening into the shaped chamber. The chamber is filled with transparent substance such as acrylic resin and thus this chamber is formed of multiple convex lenses. A sheet of metallized plastic film with embossed pattern is placed right behind this chamber.

By such a construction, a static display device is formed whereby ambient light or light supplied by an illuminating means enters the device and is acted upon by the metallized film as well as by the lenses to diffuse and redirect the light in such a fashion that the light is reflected in a distinctive and appealing manner. Each embossed pattern of the metallized film gives its reflection a distinctive and appealing character.

The present invention is to provide a novel static display device capable of reflecting light as to portray movement and make indicia such as words, names, etc., more noticeable to the casual observer.

The device of the present invention also has other applications with respect to situations in which an appealing visual display is desirable such as, for example, artistic displays, home and building numeral identification, advertising signs, general purpose signs, decorations and a variety of other applications. The present invention, both as to its organization and manner of operation, together with further objects and advantages, may best be understood by reference to the following description.

DRAWING

Figure 4A:
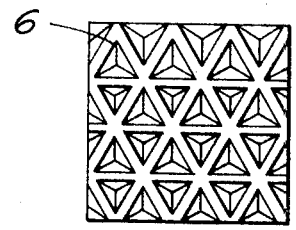
Figure 4B:
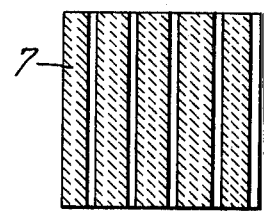

FIGS. 4a and b are front views of two embossed metallized film patterns.

Figure 1:
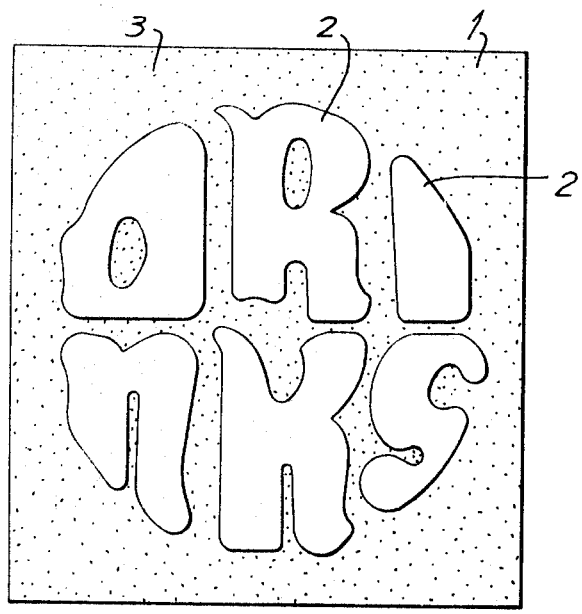
FIG. 1 is a front elevational view of an article incorporating the light-reflective display device of the present invention.

In FIG. 1 a sign DRINKS is illustrated. Letters D, R, I, N, K and S are vacuum formed on panel 1, which is transparent. Acrylic resin is poured into these vacuum-formed letters and each letter is formed as a lens 2. Panel 1 is painted with an opaque color excepting for the letters D, R, I, N, K and S. The paint is indicated at 3.

Figure 2:
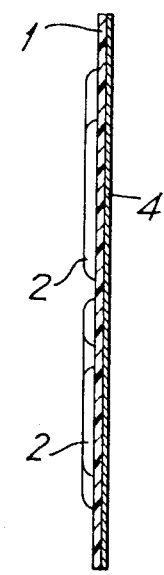
FIG. 2 is a partly cross-sectional view of the display device illustrated in FIG. 1.

Referring next to FIG. 2, an embossed metallized plastic film 4 is fastened at the back of the lens form letters and the surface of this film faces at the back side of the lens form letter.

Figure 3:
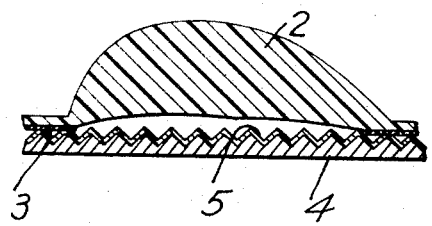
FIG. 3 is a detailed cross-sectional view, on enlarged scale, of a part of the display illustrated in FIG. 2.

FIG. 3 is a sectional view wherein 2 is the lens form letter, 3 is the opaque portion of the panel, 4 is the embossed metallized film and 5 indicates the surface of the embossed metallized film.

FIGS. 4a and b show two different patterns of embossed films: one pattern 6 and the other pattern 7. These two patterns are only for illustration purposes and there are many different types of patterns as far as the embossed patterns are concerned.

When an observer passes in front of this sign and observes the same, the pattern reduces in size, the reduced portion enlarges its size, the enlarged portion reduces its size, and deformation of design takes place depending on the position of the lens letter. A continuation of reduction in size, enlargement and deformation of the embossed pattern design takes place in a very irregular way and gives an impression, to the observer of this sign as he passes in front of it, that the embossed design behind the letter is changing and moving.

Light entering into the multiple-lens sign hits the multiple angles of the metallized film and reflection takes place in many different ways. Further, refraction takes place when the reflected rays of light emerge from the multiple-lens letters.

This sign letter stands out even in dim light and glitters; the stronger the light, the stronger the glitter.

Figure 3A:
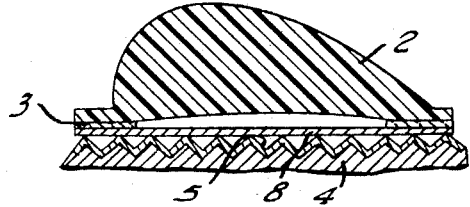
FIG. 3a shows a modified version of the arrangement in FIG. 3.

When a light color transparent film 8 is placed between the lens letters and the metallized film as shown in FIG. 3a, the reflected light from the metallized film shows a glittering color which is very eye catching.

Different types of light result in different types of reflecting of the sign. This makes the sign look complicated and interesting. The sign gives a different impression in the morning light, noon light, evening light and moonlight. The sign also gives a different impression depending on the location of the artificial light source.

What I claim is:

1. A light-reflecting device comprising a transparent panel including at least one light-permeable element deformed at the front surface of said panel to provide a lens form character, opaque-coating means on said panel in regions outside said light-permeable element, and an embossed metal film on the back surface of said panel behind the lens form character for reflecting light in a plurality of angles through the light-permeable element.

2. A light-reflecting device as claimed in claim 1 wherein said metal film extends substantially in a plane behind the back surface of the light-permeable element.

3. A light-reflecting device as claimed in claim 2 wherein said metal film is spaced from the back surface of said light-permeable element.

4. A light-reflecting device as claimed in claim 3 wherein said light-permeable element is hollow and includes a filling of transparent material whereby the light-permeable element is of solid lens form character.

5. A light-reflecting device as claimed in claim 4 wherein said lens form is convex.

6. A light-reflecting device as claimed in claim 5 comprising a carrier for said film coextensive with said panel.

7. A light-reflecting device as claimed in claim 1 comprising a colored light-permeable sheet between said light-permeable element and said metal film.